(12) United States Patent
Chung

(10) Patent No.: US 10,082,680 B2
(45) Date of Patent: Sep. 25, 2018

(54) SPECTACLES WITH ILLUMINATING LIGHT HAVING QUICK-RELEASE STRUCTURE

(71) Applicant: Hsi-An Chung, Taichung (TW)

(72) Inventor: Hsi-An Chung, Taichung (TW)

( * ) Notice: Subject to any disclaimer, the term of this patent is extended or adjusted under 35 U.S.C. 154(b) by 0 days.

(21) Appl. No.: 15/655,923

(22) Filed: Jul. 21, 2017

(65) Prior Publication Data
US 2017/0315385 A1 Nov. 2, 2017

(30) Foreign Application Priority Data
Aug. 26, 2016 (TW) .............................. 105213096 U

(51) Int. Cl.
| | | |
|---|---|---|
| G02C 1/00 | (2006.01) | |
| G02C 11/04 | (2006.01) | |
| G02C 5/14 | (2006.01) | |
| F21V 21/088 | (2006.01) | |
| F21V 21/14 | (2006.01) | |
| F21V 21/30 | (2006.01) | |

(52) U.S. Cl.
CPC .......... *G02C 11/04* (2013.01); *F21V 21/0885* (2013.01); *F21V 21/145* (2013.01); *F21V 21/30* (2013.01); *G02C 5/14* (2013.01)

(58) Field of Classification Search
CPC ........ G02C 11/10; G02C 11/04; F21V 21/048
USPC ............................ 351/158, 41; 362/103, 800
See application file for complete search history.

(56) References Cited

U.S. PATENT DOCUMENTS

2011/0317402 A1* 12/2011 Cristoforo ................ A42B 3/04
                                                              362/106
2013/0250232 A1*  9/2013 Belbey ..................... G02C 7/02
                                                              351/158

* cited by examiner

*Primary Examiner* — Hung Dang

(57) ABSTRACT

Spectacles with an illuminating light having a quick-release structure are provided. A clip piece of a clip member is inserted through a through hole of a temple, and the clip member can be rotated and operated. The clip piece is adapted to clip an inner surface of the temple and a buckle hole of the clip piece is engaged with an engaging protrusion on the inner surface of the temple, such that the illuminating light is secured on the temple. On the contrary, the illuminating light can be quickly removed from the temple. The overall structure can effectively enhance the convenience of the use of the spectacles for the installation of the illuminating light.

6 Claims, 8 Drawing Sheets

SPECTACLES WITH ILLUMINATING LIGHT HAVING QUICK-RELEASE STRUCTURE

FIELD OF THE INVENTION

The present invention relates to spectacles with an illuminating light having a quick-release structure which can effectively enhance the convenience of the use of the spectacles for the installation of the illuminating light.

BACKGROUND OF THE INVENTION

These days, there are various spectacles on the market for a user to make a choice according to their needs. For sports eyeglasses, the temples of the sports eyeglasses are provided with a tightening strap for adjustment, so that the glasses won't fall when the wearer does the exercise. The front of the spectacle frame may be pivotally connected with auxiliary lenses as sunglasses when the wearer goes out or as orthopedic glasses.

An auxiliary illumination device for spectacles is commercially available in "spectacles with illuminating light". The front of the spectacle frame of the spectacles is formed with a hole. The hole is mounted with an illuminating light. Because the light is disposed on the spectacle frame beside the lens, the light will directly stimulate the eyes.

Conventional "spectacles with chargeable and three-stage control illuminating light" and "spectacles with rechargeable illuminating light" are also disclosed. The illuminating light is disposed at the outer side of the front end of the temple to reduce the stimulation of the light on the eyes. However, the circuit board, the battery, the switch and a portion of the illuminating member of the illuminating light are accommodated in the temple. It is necessary to replace temples without the illuminating light when there is no need for the illuminating light, which results in much inconvenience for the use of the spectacles. If the illuminating light can be independently and randomly assembled to or disassembled from the temple, it will increase the convenience of the use of the illuminating light for the spectacles. Accordingly, the inventor of the present invention has devoted himself based on his many years of practical experiences to solve these problems.

SUMMARY OF THE INVENTION

The primary object of the present invention is to provide spectacles with an illuminating light having a quick-release structure. The spectacles comprise a spectacle frame with lenses. Two sides of the spectacle frame are provided with temples, respectively. At least one of the temples is provided with an illumination light. The temple has a plate body. The plate body has a through hole. An inner surface of the plate body is provided with an engaging protrusion close to one side of the through hole. The illuminating light is provided with a clip member disposed on a side surface of a light fixture which can project an illumination light source. The clip member includes a base piece coupled to the side surface of the light fixture. One end of the base piece is provided with an L-shaped clip piece. The clip piece is formed with a buckle hole close to a tail end thereof and corresponding to the engaging protrusion of the temple. After the clip piece of the clip member is inserted through the through hole of the temple, the clip member is rotated and operated. The clip piece is adapted to clip the inner surface of the temple and the buckle hole of the clip piece is engaged with the engaging protrusion, such that the illuminating light is secured on the temple. On the contrary, the illuminating light can be quickly removed from the temple. The overall structure can effectively enhance the convenience of the use of the spectacles for the installation of the illuminating light.

Preferably, the through hole of the temple corresponds in shape and in size to the joint of the base piece and the clip piece of the clip member, having a □-like shape. When the clip piece of the clip member is inserted through the through hole of the temple, the clip piece can be freely rotated and operated for the buckle hole to engage with the engaging block of the temple.

Preferably, the inner surface of the plate body of the temple is provided with a recess corresponding in shape to the clip piece. The engaging protrusion is formed on a bottom surface of the recess. When the buckle hole of the clip piece is engaged with the engaging protrusion, the clip piece is accommodated in the recess, so that the clip piece does not protrude out of the inner surface of the plate body of the temple. The inner surface of the plate body of the temple can maintain a flat effect for use.

Preferably, the side surface of the light fixture of the illuminating light is provided with a pivot member. The base piece of the clip member is provided with a pivot hole relative to the pivot member. The pivot member is pivoted to the pivot hole so that the clip member is pivotally connected to the side surface of the light fixture. The light fixture and the clip member may be rotated and adjusted with the pivot member as a pivot. When the illuminating light is mounted on the temple and the user wears the spectacles, the light fixture can be directly rotated and operated on the temple for adjusting the projection angle of the light fixture. The base piece is provided with a protrusion near one side of the pivot hole. The protrusion is configured to lean against the side surface of the light fixture. The projection is pressed against the side surface of the light fixture to restrict sliding, so that the light fixture will not randomly swing after the light fixture is adjusted on the temple for the projection angle of the light fixture, thereby providing a positioning effect. The pivot member is a T-shaped fastener having a head portion and a neck portion. The pivot hole has a keyhole shape. The pivot hole has an insertion portion corresponding in size to the head portion and a buckle portion corresponding in size to the neck portion. The head portion of the pivot member passes through the insertion portion of the pivot hole with the neck portion of the pivot member to engage with the buckle portion, so that the clip member can be easily assembled to or disassembled from the side surface of the light fixture without using any tool.

DETAILED DESCRIPTION OF THE PREFERRED EMBODIMENTS

Embodiments of the present invention will now be described, by way of example only, with reference to the accompanying drawings.

Figure 1:
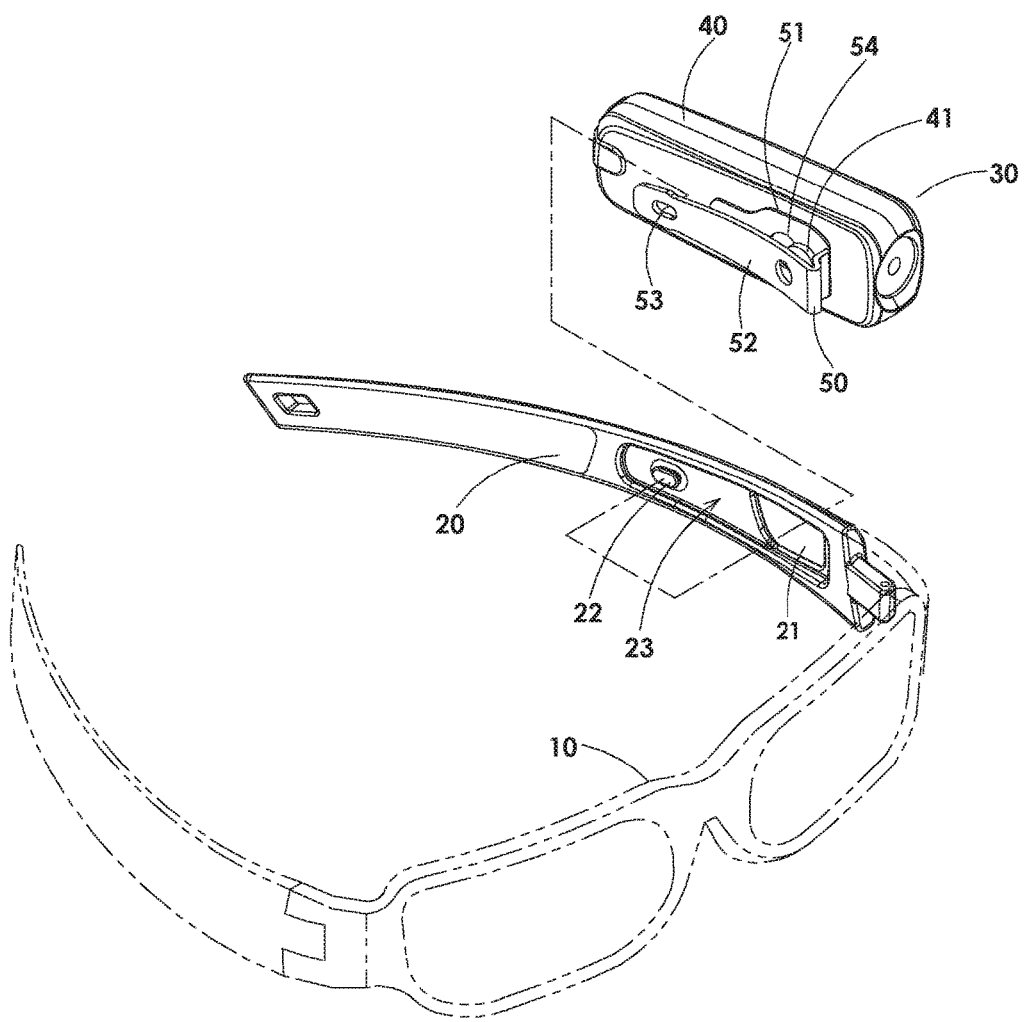
FIG. 1 is an exploded view of the illuminating light and the temple of the present invention.
Figure 2:
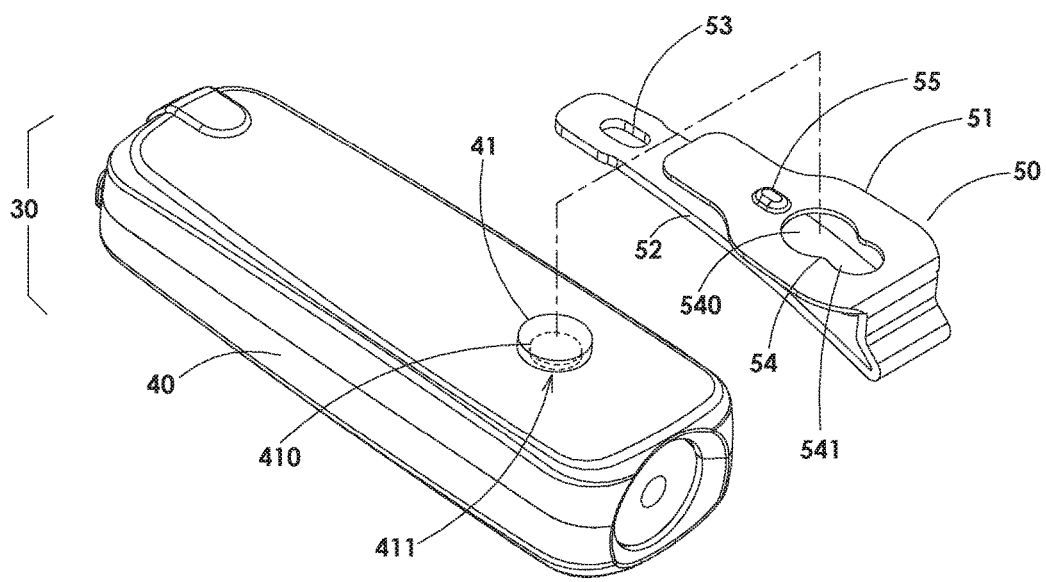
FIG. 2 is an exploded view of the illuminating light of the present invention.
Figure 3:
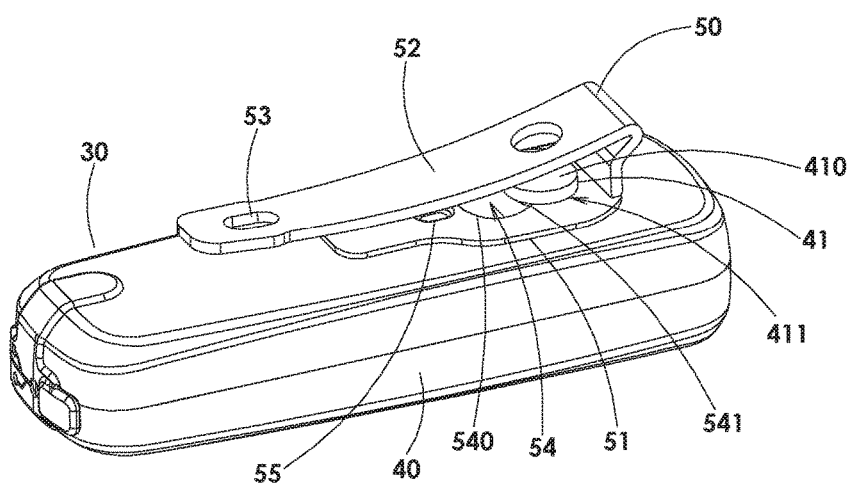
FIG. 3 is a perspective view of the illuminating light of the present invention.
Figure 4:
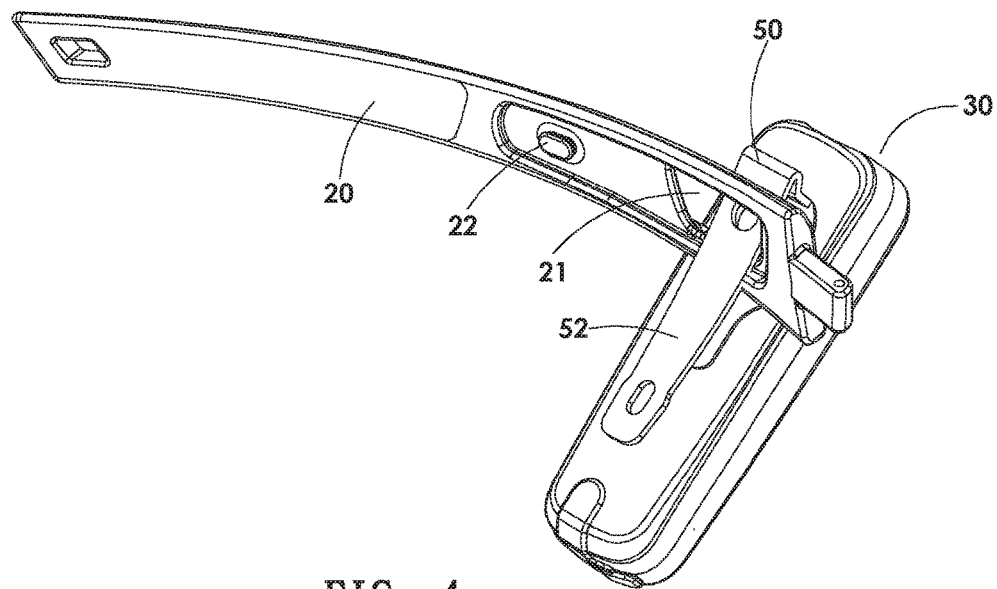
FIG. 4 is a schematic view of the present invention, showing that the clip piece of the clip member of the illuminating light is inserted through the through hole of the temple.
Figure 5:
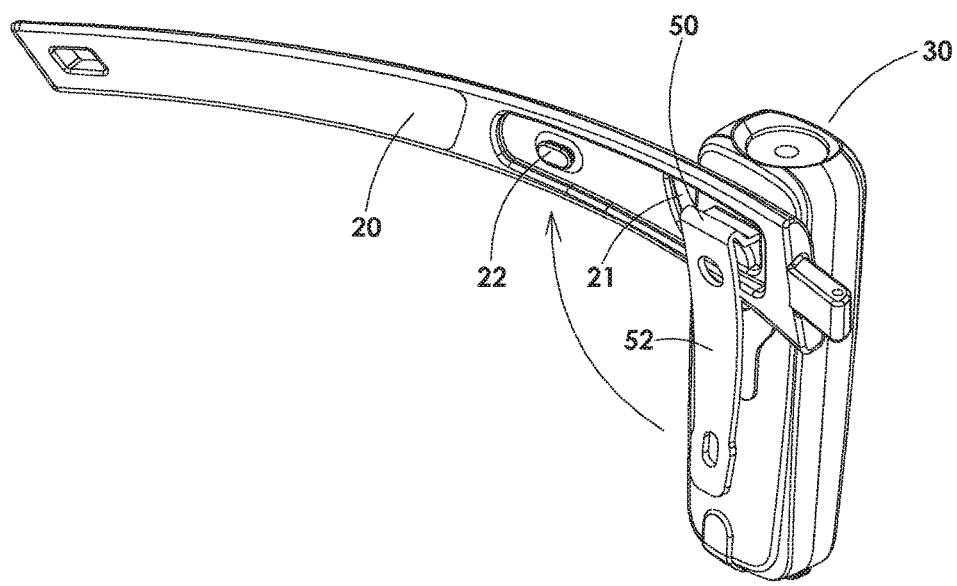
FIG. 5 is a schematic view of the present invention, showing that the clip piece of the clip member of the illuminating light is inserted through the through hole of the temple before rotated.

Spectacles with an illuminating light having a quick-release structure, as shown in FIG. 1, FIG. 2 and FIG. 3, comprise a spectacle frame 10 with lenses. Two sides of the spectacle frame 10 are provided with temples 20, respectively. At least one of the temples 20 is provided with an illumination light 30. The temple 20 has a plate body. The plate body has a through hole 21. An inner surface of the plate body is provided with an engaging protrusion 22 close to one side of the through hole 21. The illuminating light 30 is provided with a clip member 50 disposed on a side surface of a light fixture 40 (which may be an LED lamp containing a battery) which can project an illumination light source. The clip member 50 includes a base piece 51 coupled to the side surface of the light fixture 40. One end of the base piece 51 is provided with an L-shaped clip piece 52. The clip piece 52 is formed with a buckle hole 53 close to a tail end thereof and corresponding to the engaging protrusion 22 of the temple 20. As shown in FIG. 4, after the clip piece 52 of the clip member 50 is inserted through (passes through) the through hole 21 of the temple 20, the clip member 50 is rotated and operated. A shown in FIG. 6, the clip piece 52 is adapted to clip the inner surface of the temple 20 and the buckle hole 53 of the clip piece 52 is engaged with the engaging protrusion 22, such that the illuminating light 30 is secured on the temple 20. On the contrary, as shown in FIG. 5, FIG. 4, and FIG. 1, the illuminating light 30 can be quickly removed from the temple 20. The overall structure can effectively enhance the convenience of the use of the spectacles for the installation of the illuminating light 30.

According to the aforesaid embodiment, as shown in FIG. 1, the through hole 21 of the temple 20 corresponds in shape and in size to the joint of the base piece 51 and the clip piece 52 of the clip member 50, having a □-like shape. As shown in FIG. 4 and FIG. 5, when the clip piece 52 of the clip member 50 is inserted through the through hole 21 of the temple 20, the clip piece 52 can be freely rotated and operated for the buckle hole 53 to engage with the engaging block 22 of the temple 20.

Figure 6:
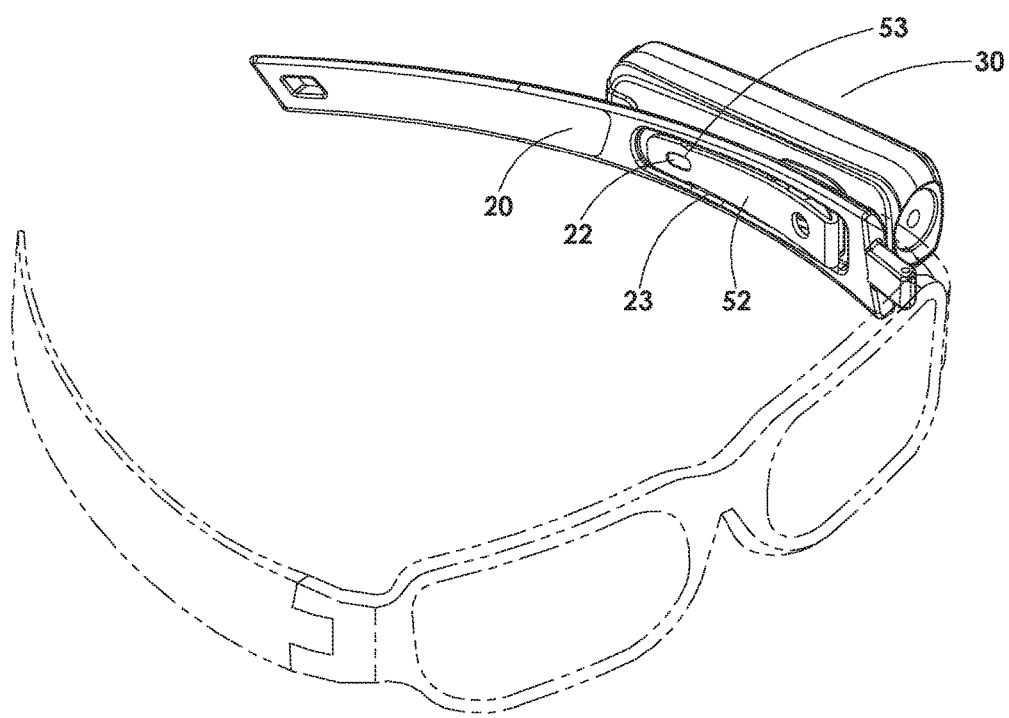
FIG. 6 is a perspective view of the present invention, showing the illuminating light is mounted on the temple.

According to the aforesaid embodiment, as shown in FIG. 1, the inner surface of the plate body of the temple 20 is provided with a recess 23 corresponding in shape to the clip piece 52. The engaging protrusion 22 is formed on a bottom surface of the recess 23. As shown in FIG. 6, when the buckle hole 53 of the clip piece 52 is engaged with the engaging protrusion 22, the clip piece 52 is accommodated in the recess 23, so that the clip piece 52 does not protrude out of the inner surface of the plate body of the temple 20. The inner surface of the plate body of the temple 20 can maintain a flat effect for use.

Figure 7:
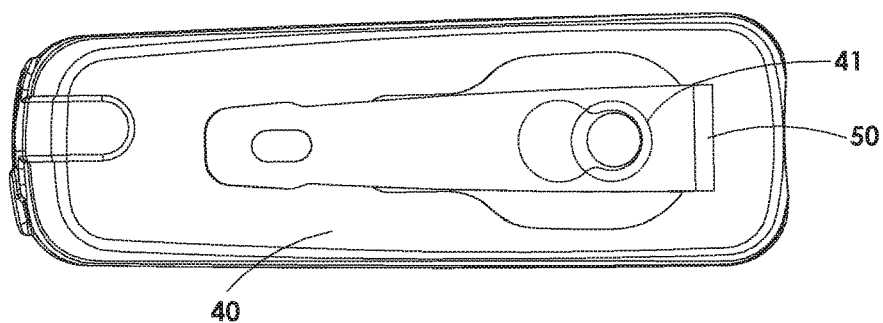
FIG. 7 is a schematic view of the present invention, showing that the clip member is not rotated and adjusted relative to the light fixture of the illuminating light for an angular adjustment.
Figure 8:
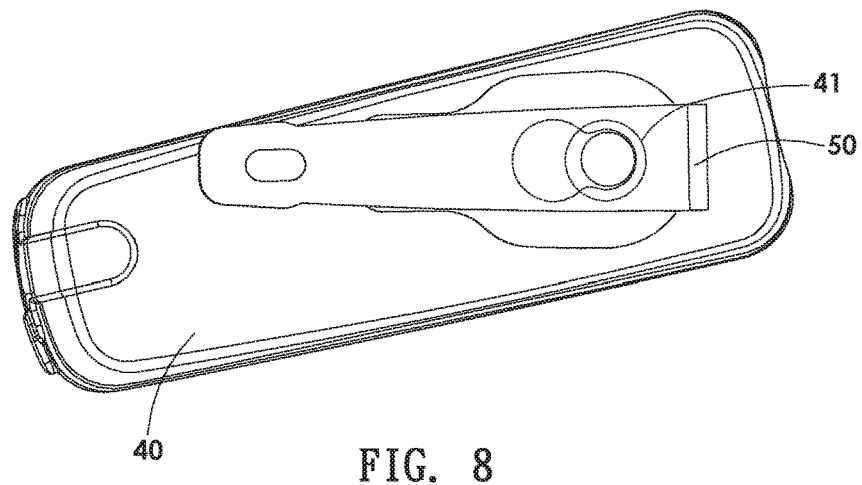
FIG. 8 is a schematic view of the present invention, showing that the clip member is rotated and adjusted relative to the light fixture of the illuminating light for an angular adjustment.
Figure 9:
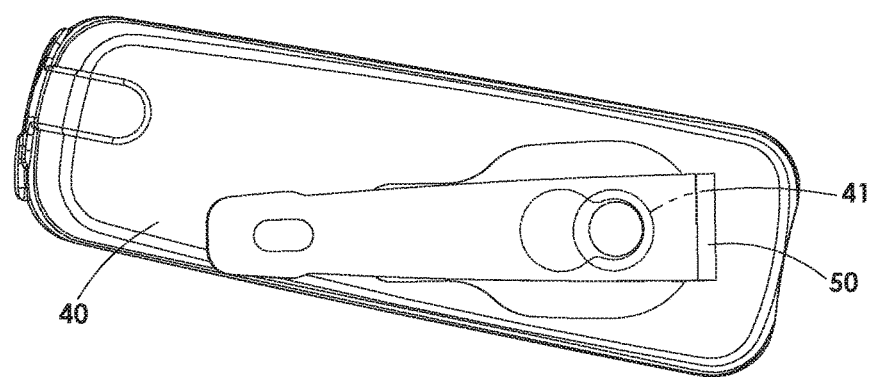
FIG. 9 is a schematic view of the present invention, showing that the clip member is rotated and adjusted relative to the light fixture of the illuminating light for another angular adjustment.
Figure 10:
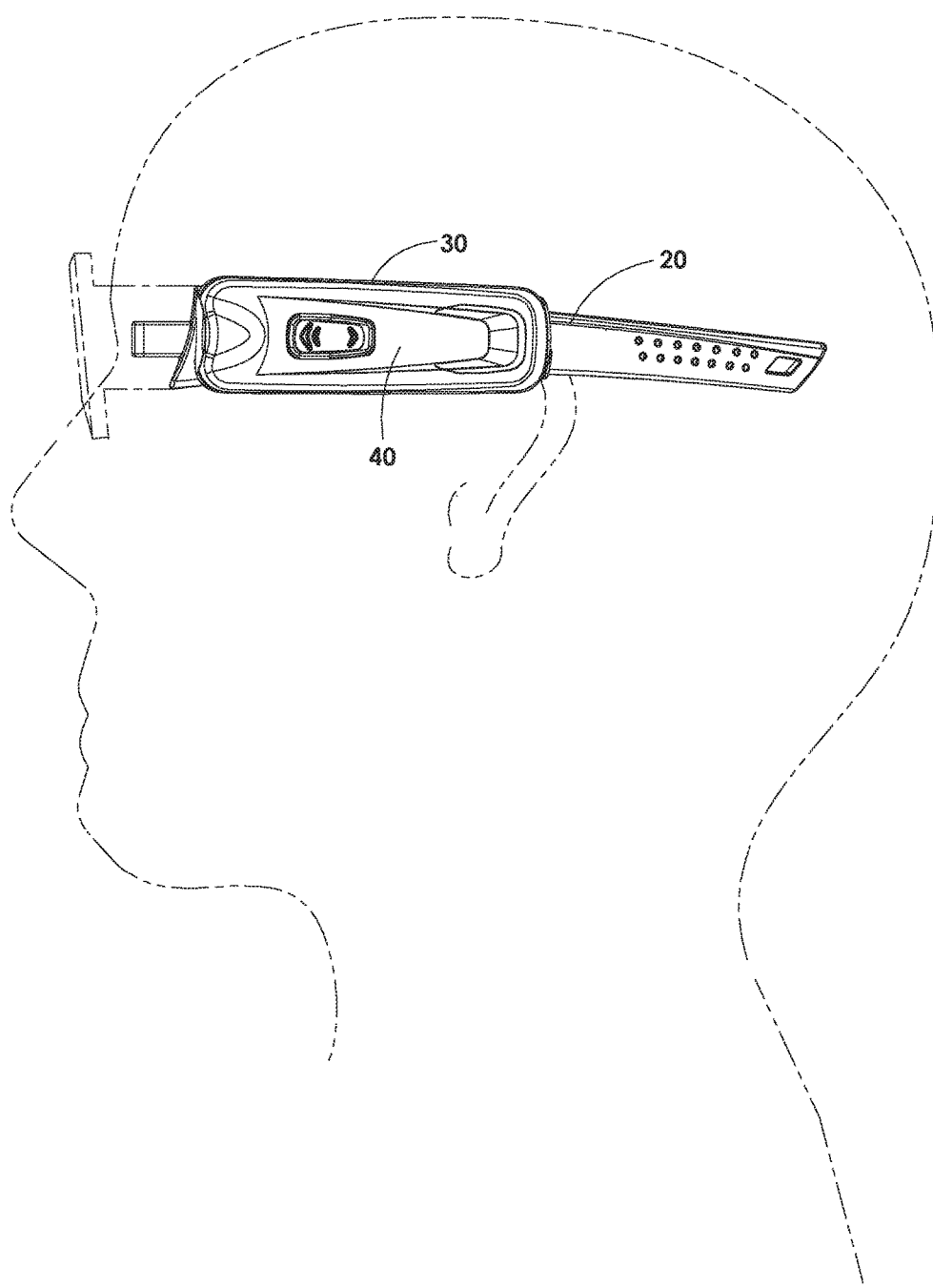
FIG. 10 is a schematic view of the present invention when in use, showing that the illuminating light is horizontally mounted on the temple.
Figure 11:
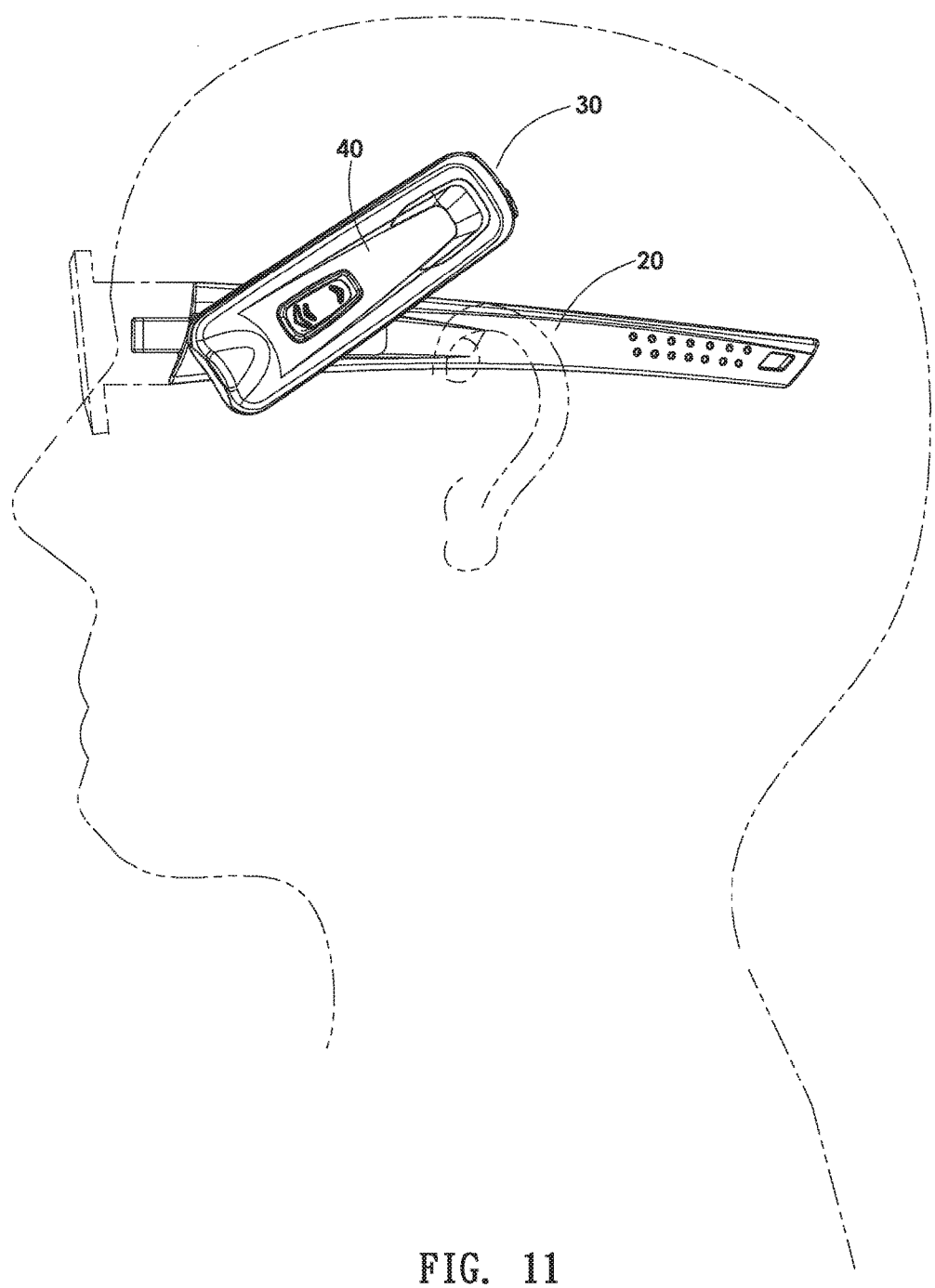
FIG. 11 is a schematic view of the present invention when in use, showing that the illuminating light inclines downward relative to the temple.
Figure 12:
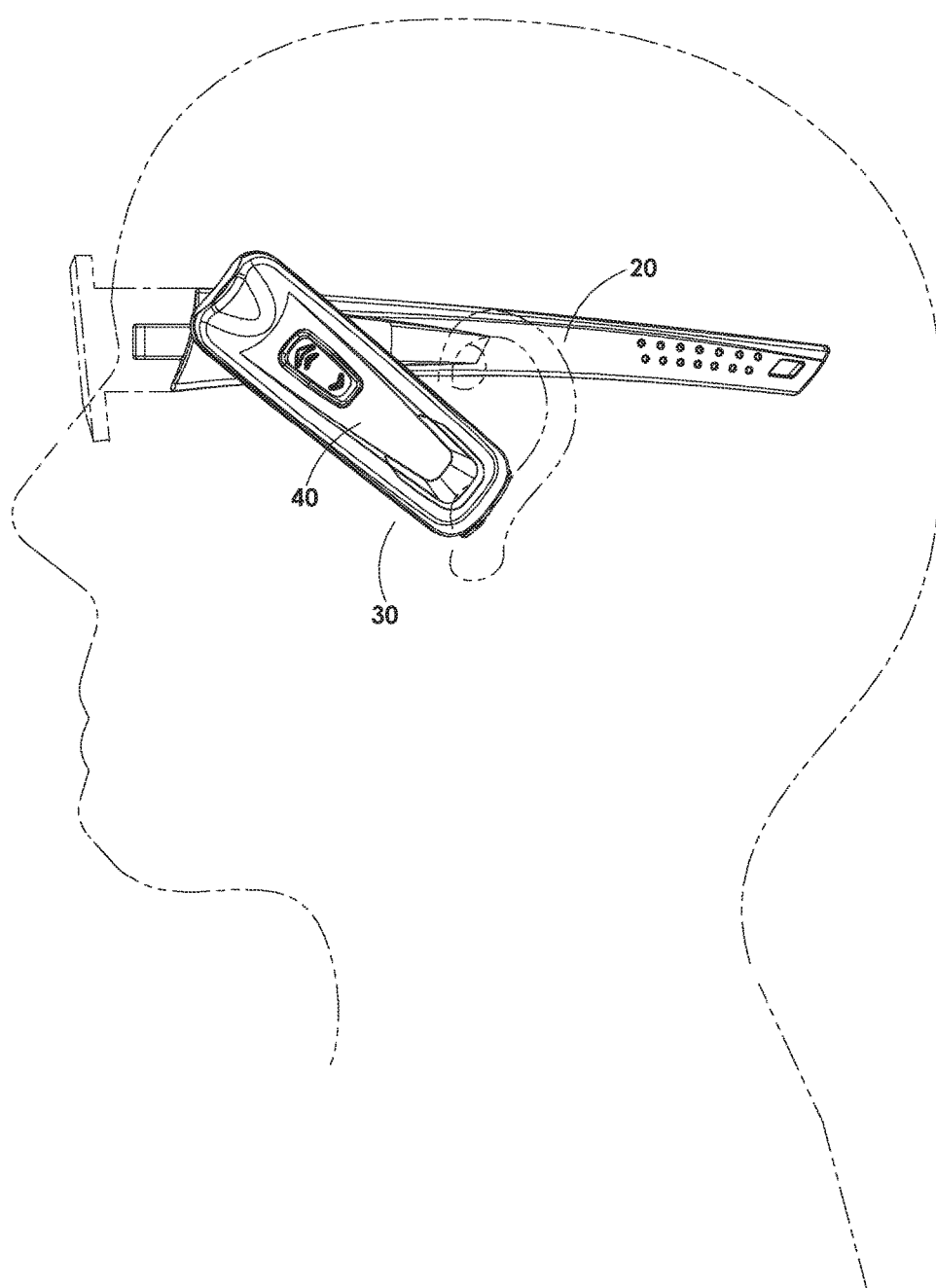
FIG. 12 is a schematic view of the present invention when in use, showing that the illuminating light inclines upward relative to the temple.

According to the aforesaid embodiment, as shown in FIG. 1 and FIG. 2, the side surface of the light fixture 40 of the illuminating light 30 is provided with a pivot member 41. The base piece 51 of the clip member 50 is provided with a pivot hole 54 relative to the pivot member 41. The pivot member 41 is pivoted to the pivot hole 41 so that the clip member 50 is pivotally connected to the side surface of the light fixture 40. As shown in FIG. 7, FIG. 8, and FIG. 9, the light fixture 40 and the clip member 50 may be rotated and adjusted with the pivot member 41 as a pivot. As shown in FIG. 10, FIG. 11, and FIG. 12, when the illuminating light 30 is mounted on the temple 20 and the user wears the spectacles, the light fixture 40 can be directly rotated and operated on the temple 20 for adjusting the projection angle of the light fixture 40. As shown in FIG. 2 and FIG. 3, the base piece 51 is provided with a protrusion 55 near one side of the pivot hole 54. The protrusion 55 is configured to lean against the side surface of the light fixture 40. The projection 55 is pressed against the side surface of the light fixture 40 to restrict sliding, as shown in FIG. 10, FIG. 11, and FIG. 12, so that the light fixture 40 will not randomly swing after the light fixture 40 is adjusted on the temple 20 for the projection angle of the light fixture 40, thereby providing a positioning effect. As shown in FIG. 2, the pivot member 41 is a T-shaped fastener having a head portion 410 and a neck portion 411. The pivot hole 54 has a keyhole shape. The pivot hole 54 has an insertion portion 540 corresponding in size to the head portion 410 and a buckle portion 541 corresponding in size to the neck portion 411. As shown in FIG. 2 and FIG. 3, the head portion 410 of the pivot member 41 passes through the insertion portion 540 of the pivot hole 54 with the neck portion 411 of the pivot member 41 to engage with the buckle portion 541, so that the clip member 50 can be easily assembled to or disassembled from the side surface of the light fixture 40 without using any tool.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. Spectacles with an illuminating light having a quick-release structure, comprising a spectacle frame with lenses, each of two sides of the spectacle frame being provided with a temple, at least one of the temples at the two sides of the spectacle frame being provided with the illumination light, the temple having a plate body, the plate body having a through hole, an inner surface of the plate body being provided with an engaging protrusion close to one side of the through hole; the illuminating light being provided with a clip member disposed on a side surface of a light fixture, the clip member including a base piece coupled to the side surface of the light fixture, one end of the base piece being provided with an L-shaped clip piece, the clip piece being formed with a buckle hole close to a tail end thereof and corresponding to the engaging protrusion of the temple.

2. The spectacles as claimed in claim 1, wherein the through hole of the temple corresponds in shape and in size to the joint of the base piece and the clip piece of the clip member, having a □-like shape.

3. The spectacles as claimed in claim 1, wherein the inner surface of the plate body of the temple is provided with a recess corresponding in shape to the clip piece, and the engaging protrusion is formed on a bottom surface of the recess.

4. The spectacles as claimed in claim 1, wherein the side surface of the light fixture of the illuminating light is provided with a pivot member, the base piece of the clip member is provided with a pivot hole relative to the pivot member, and the pivot member is pivoted to the pivot hole so that the clip member is pivotally connected to the side surface of the light fixture.

5. The spectacles as claimed in claim 4, wherein the base piece is provided with a protrusion near one side of the pivot hole, and the protrusion is configured to lean against the side surface of the light fixture.

6. The spectacles as claimed in claim 4, wherein the pivot member is a T-shaped fastener having a head portion and a neck portion, the pivot hole has a keyhole shape, and the pivot hole has an insertion portion corresponding in size to the head portion and a buckle portion corresponding in size to the neck portion.

* * * * *